United States Patent

[11] 3,574,427

| [72] | Inventor | James K. Faull |
| | | 16 Walker Court, Poland, Ohio 44514 |
| [21] | Appl. No. | 813,250 |
| [22] | Filed | Apr. 3, 1969 |
| [45] | Patented | Apr. 13, 1971 |

[54] PIVOT CONSTRUCTION
4 Claims, 4 Drawing Figs.

[52] U.S. Cl. .................................................. 308/135
[51] Int. Cl. ............................................... F16c 17/04
[50] Field of Search ........................................ 273/1;
272/57 (A); 308/(N)

[56] References Cited
UNITED STATES PATENTS

| 2,913,284 | 11/1959 | Zankl ........................... | 308/N |
| 3,193,335 | 7/1965 | Wing ............................ | 308/238 |
| 3,418,027 | 12/1968 | Asmanes ....................... | 308/238 |

FOREIGN PATENTS

| 571,829 | 1/1958 | Italy ............................. | 308/N |
| 967,087 | 8/1964 | Great Britain ................ | 308/238 |

Primary Examiner—Fred C. Mattern, Jr.
Assistant Examiner—Frank Susko
Attorney—Williams and Kreske ABSTRACT: A pivot construction for a swivel device having a pair of platelike members in face-to-face relation relatively rotatable about the pivot axis. The novel pivot construction includes a shouldered pivot pin anchored to one of the members and spaced from the other member by low friction bodies, one of which is keyed to the other member to insure unitary movement therewith.

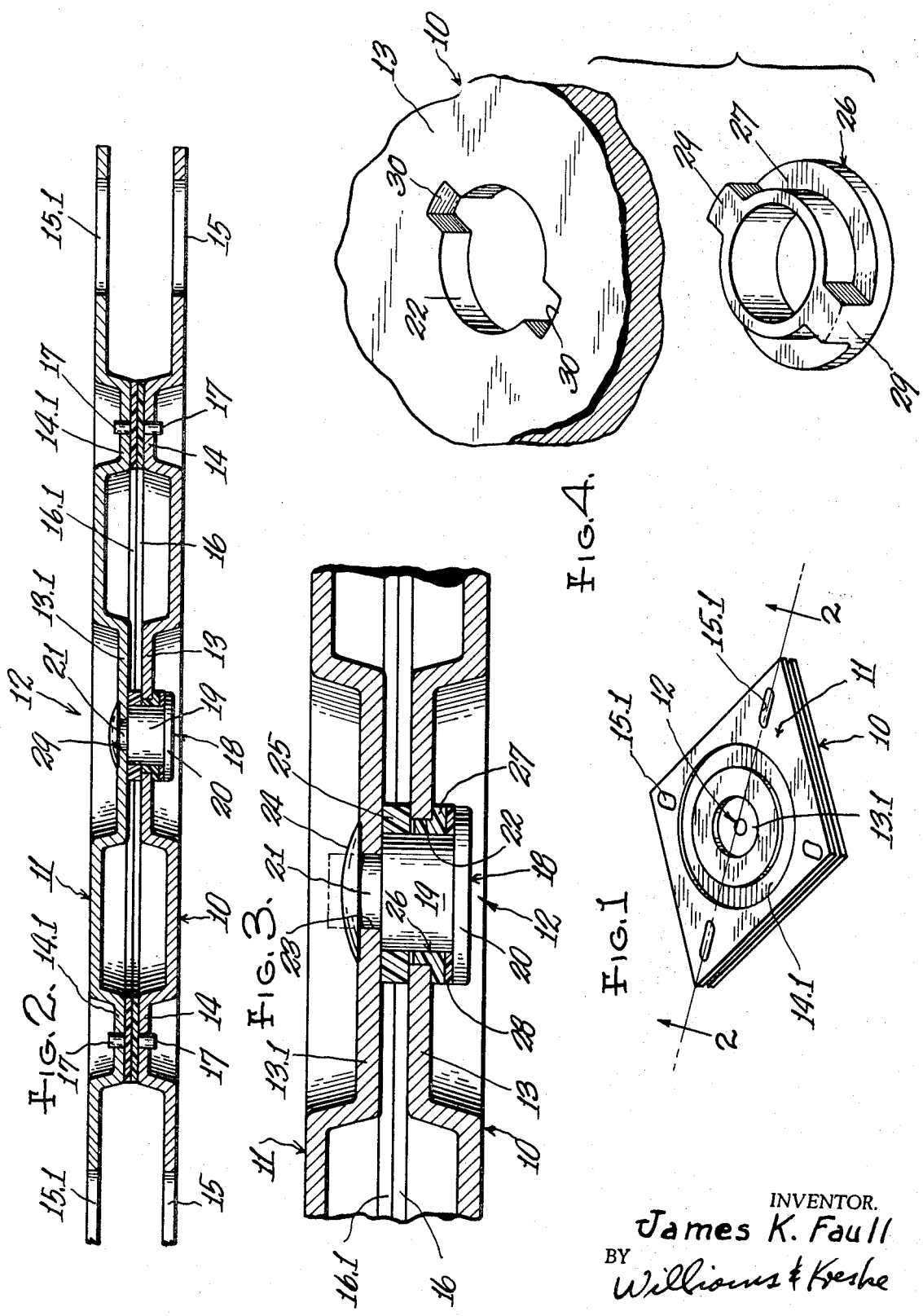

PIVOT CONSTRUCTION

BACKGROUND AND SUMMARY

The present invention is an improvement over that disclosed in application Ser. No. 602,074 of Herbert W. Niemi, entitled THRUST BEARING ASSEMBLY, and has as its principal object the provision of a pivot construction having long, trouble-free life under heavy thrust loads.

While the pivot construction disclosed in FIG. 5 of the application aforesaid is sound in concept and is quite satisfactory in the majority of instances, normal manufacturing tolerances between the various parts has resulted in unfavorable wear under severe usage. This has been caused by relative rotation between parts which should remain fixed together and by rough surfaces from manufacturing operations unavoidably remaining on certain parts. Behind the present invention is recognition that cost considerations make it impractical to tighten manufacturing tolerances and therefore proper operation must be insured despite such tolerances.

The present invention insures proper operation of the various pivot parts by interlocking those parts which are to be affixed together to thus insure that rotation between certain parts takes place in the expected manner despite normal manufacturing tolerances. Moreover, the present invention insures that the rubbing surfaces between various parts are compatible for minimum friction and wear despite the presence of rough surfaces and edges which cannot economically be eliminated in the manufacturing processes.

These and other advantages will readily become apparent from a study of the following description and from the appended drawing, and in this drawing:

DRAWING DESCRIPTION

FIG. 1 is a perspective view of a swivel device embodying the present invention, FIG. 2 is an enlarged sectional view generally corresponding to the line 2–2 of FIG. 1, FIG. 3 is a fragmentary, enlarged sectional view of a portion of the device seen in FIG. 2, and FIG. 4 is a still further enlarged, fragmentary perspective view of certain details seen in FIG. 3.

DETAILED DESCRIPTION

The present invention is an improvement over that disclosed in the patent application hereinbefore mentioned; accordingly, a detailed description of its use is believed to be unnecessary. In brief, however, the present device provides a mechanism whereby a seat, for example, may be secured to a base for swivel movement relatively thereto. Such device, however, may be used wherever two members are to be connected together for relative swiveling movement, especially where thrust loads; this is, loads applied in a direction axially of the rotational axis of the members, are heavy.

As best seen in FIGS. 1 and 2, the present invention is herein shown to comprise a pair of platelike members 10, 11 disposed in face-to-face relation and connected together by means 12 providing a pivot axis about which the members 10 and 11 are relatively rotatable. In the example above used, one of the members, for example 10, may be secured to the stool base while the member 11 may be secured to the overlying seat thus connecting the seat to the base for swivel movement.

In the embodiment herein shown, the platelike members 10, 11 are generally square and, except for a distinction later to be pointed out, such members may be identical. With particular reference to FIG. 2, member 10 has a central, flat-topped boss 13 encircled by an annular, flat-topped boss 14 concentric therewith. Slots 15 (see also FIG. 1) may be formed at the corners of member 10 to pass fasteners (not shown) by means of which such member may be secured, for example, to the base previously mentioned.

As respects the structure thus far described, member 11 is identical to member 10 and thus corresponding parts are identified by the same reference characters but with the suffix "1" appended. As best seen in FIG. 2, members 10, 11 are disposed with their bosses 13, 13.1 and 14, 14.1 in facing relation; however, as herein disclosed, thin, annular, low-friction rings 16, 16.1 are interposed between the bosses 14, 14.1 to form thrust bearing surfaces. Rings 16, 16.1 may be formed of suitable plastic materials which are comparable for minimum friction. For example, one of the rings may be formed of nylon or acetal while the other may be formed of one of the fluorocarbons. To insure rotation of such rings with respective members and to insure retention of such rings in position, each ring may carry a plurality of integral protrusions 17 receivable in apertures formed in respective, member annular bosses.

As best seen in FIGS. 2 and 3, pivot means 12 comprises a pin 18 having a shank portion 19, a radially enlarged shoulder 20, and a reduced diameter axial extension 21. Pin shank 19 extends through an enlarged aperture 22 in the central boss 13 of member 10 and such shank abuts the boss 13.1 of member 11 with the pin shank extension 21 passing through a closely fitting aperture 23 in the member boss 13.1. As illustrated in FIG. 3, the free end of extension 21 is headed over at 24 from its original, phantom line shape, to thus securely anchor the pin to the member 11.

Interposed between the member bosses 13, 13.1 in encircling relation with the pin shank portion 19 is a plastic washer 25 which functions as a spacer between the members. Closely fitting within the member aperture 22 is a plastic sleeve 26 having a radially enlarged flange 27 seated against the member boss 13 and interposed between the latter and the pin shoulder 20. Sleeve 26 has a bore for rotatably receiving the pin shank 19 and the length of sleeve 26 is such that a slight axial clearance is provided between the sleeve and the washer 25.

While sleeve flange 27 could bear directly against pin shoulder 20, it has been found that as a result of the manufacturing operation by which pin 18 is made, the adjoining face of the pin shoulder does not always provide a suitable bearing surface. Accordingly, it has been found expedient to interpose a thin washer 28 about the pin shank 19, between the pin shoulder 20 and the sleeve flange 27. Preferably, washer 28 will be of a plastic compatible with the sleeve 26 for minimum friction therebetween. The sleeve 26 and the washer 28 may conveniently be made of the respective plastic materials previously mentioned in the description of the annular rings 16, 16.1.

Means are provided to insure rotation of sleeve 26 with member 10 and as seen in FIG. 4, such sleeve has diametrically opposed, integral projections 29 extending both radially outwardly thereof and axially of its flange portion 27. Projections 29 are closely receivable within opposed notches 30 extending radially outwardly of the aperture 22 in the member boss 13.

From the foregoing, it is believed that the manner of assembly of the present device will readily be apparent to those skilled in the art and therefore a detailed description thereof would be superfluous.

I claim:

1. In an antifriction swivel structure formed of a pair of platelike members in face-to-face relation and having pivot means connecting said members together for relative pivotal movement, the improvement wherein said pivot means comprises:

a pin anchored to one of said members for unitary movement therewith and having a shank portion extending through an enlarged aperture in the other of said members and terminating in a radially enlarged shoulder adjacent to but spaced from said other member;

a sleeve of low-friction material disposed within said other member enlarged aperture, said sleeve having a bore for rotatably receiving said pin shank portion and also having a radially enlarged flange interposed between said pin shoulder and said other member;

a washer of low-friction material interposed between said pin shoulder and said sleeve flange to reduce friction therebetween upon relative rotative movement of said members; and means in part provided by said sleeve and in part provided by said other member and interengaging to prevent relative rotation between said member and said sleeve.

2. In an antifriction swivel structure formed of a pair of platelike members in face-to-face relation and having pivot means connecting said members together for relative pivotal movement, the improvement wherein said pivot means comprises:

a pin anchored to one of said members for unitary movement therewith and having a shank portion extending through an enlarged aperture in the other of said members and terminating in a radially enlarged shoulder adjacent to but spaced from said other member;

a sleeve of low-friction material disposed within said other member enlarged aperture, said sleeve having a bore for rotatably receiving said pin shank portion and also having a radially enlarged flange interposed between said pin shoulder and said other member; and said sleeve having an integral projection extending both radially outwardly thereof and axially of its flange, said projection being closely receivable in a recess in said other member to prevent relative rotation between the latter and said sleeve.

3. The construction of claim 1 wherein said members are spaced apart axially of said pin:

wherein a body of low-friction material is interposed between said members in encircling relation with said pin shank portion;

wherein said pin shank portion abuts said one member and has a reduced diameter, axial extension passing through a close fitting aperture therein;

wherein the free end of said pin shank extension is headed over said one member to anchor said pin thereto, said one member being gripped between said headed-over, pin shank extension and the portion of said pin which abuts said one member; and wherein a washer of low-friction material is interposed between said pin shoulder and said sleeve flange to reduce friction therebetween upon relative rotative movement of said members.

4. An antifriction swivel structure, comprising a pair of members having inner faces in confronting relation, a pin having a shank extending transversely of said members through openings axially through said faces to provide a pivot, the opening in one of said members being enlarged relative to said shank, and said pin having heads at its opposite ends overlying outer surfaces of respective members to hold them against lateral separation, a sleeve of low-friction material within the enlarged opening in said one member and having an internal opening of a size to closely pass the shank of said pin in bearing relation, said sleeve having a headed end interposed between the outer face of said one member and the adjoining head of said pin, and said sleeve and said one member having interengaging notch and lug means to prevent rotation therebetween.